United States Patent [19]

Bardell, Jr. et al.

[11] Patent Number: 5,150,366
[45] Date of Patent: Sep. 22, 1992

[54] REDUCED DELAY CIRCUITS FOR SHIFT REGISTER LATCH SCAN STRINGS

[75] Inventors: Paul H. Bardell, Jr., Carmel; William H. McAnney, LaGrangeville, both of N.Y.

[73] Assignee: International Business Machines Corp., Armonk, N.Y.

[21] Appl. No.: 561,399

[22] Filed: Aug. 1, 1990

[51] Int. Cl.⁵ .................................. H04B 17/00
[52] U.S. Cl. ................................ 371/22.3
[58] Field of Search ............ 371/22.3, 15.1, 27, 371/22.5, 22.6

[56] References Cited

U.S. PATENT DOCUMENTS

| | | | |
|---|---|---|---|
| 4,710,933 | 12/1987 | Powell et al. | 371/22.3 |
| 4,780,666 | 10/1988 | Sakashita et al. | 371/22.3 |
| 4,860,290 | 8/1989 | Daniels et al. | 371/22.3 |
| 4,897,837 | 1/1990 | Ishihara et al. | 371/22.3 |
| 5,032,783 | 7/1991 | Hwang et al. | 371/22.3 |
| 5,043,985 | 8/1991 | Lin et al. | 371/22.3 |
| 5,043,986 | 8/1991 | Agrawal et al. | 371/22.3 |

*Primary Examiner*—Jerry Smith
*Assistant Examiner*—P. M. Chung
*Attorney, Agent, or Firm*—Lawrence D. Cutter

[57] ABSTRACT

Delays in critical signal paths are eliminated in circuits employing level sensitive scan design methods for implementing self-test operations. In particular, scan strings associataed with primary input lines are segregated and supplied to a separate distinct signature register so as to permit simplified degating circuitry on the input side of those shift register latches which are in fact associated with primary input signal lines.

4 Claims, 5 Drawing Sheets

REDUCED DELAY CIRCUITS FOR SHIFT REGISTER LATCH SCAN STRINGS

BACKGROUND OF THE INVENTION

The present invention is generally directed to the reduction of delay times seen by primary input signal lines employed in conjunction with shift register latch scan strings used in circuit test. More particularly, the present invention is directed to test circuitry employing shift register latch scan strings in which scan strings associated with primary inputs are segregated and supplied to their own signature register thus permitting simplified degating circuitry on the input side of shift register latches associated with primary inputs.

As the design of electronic integrated circuit chips and devices has progressed, more and more circuitry is being disposed in increasingly dense patterns and it is becomingly correspondingly more difficult to test such circuits. One methodology for performing chip test is described in U.S. Pat. No. 4,071,902 issued to Edward Eichelberger, et al. on Jan. 31, 1978 and assigned to the same assignee as the present invention. This patent describes the basic features of the level sensitive scan design (LSSD) system for circuit test. The circuits generally considered therein include digital circuits having logic and memory functions that are used in the design and construction of digital signal processing and information handling systems and machines. Likewise here, integrated circuit devices of interest typically possess blocks of combinatorial logic whose outputs are supplied to certain memory elements. In particular, in an LSSD system the memory elements or circuits comprise shift register latches (SRLs). During test mode, these shift register latches can be logically reconfigured to operate as a shift register which is capable of storing logical output results and of moving or shifting these results into a storage register for comparison and analysis with known results.

In addition to providing circuits of greater complexity, the other significant purpose in reducing circuit size is to produce circuits which operate faster. This is accomplished as a by-product of increased circuit densification simply as a result of the fact that circuits are now close together and signals experience smaller delays from one circuit or gate to the next. Accordingly, it is seen that it is very desirable to eliminate circuit delays wherever possible. The goals of increased speed and increased circuit density are in conflict though with the need to produce chip devices which are fabricated flawlessly and operate perfectly. The goals of increased speed and denser circuit layout are also at least partially in conflict with the desire to provide built-in diagnostic circuitry which itself consumes valuable space (real estate) on a circuit chip.

During normal functioning of the integrated circuit device, information signals are stored in the memory elements (shift register latches) by the operation of one or more system clocks, and are thence supplied to blocks of combinatorial logic circuits whose outputs are again stored in memory elements by operation of one or more system clocks. Subsequently, these information signals are supplied to other combinatorial logic blocks. However, during test operations, test patterns are shifted into these memory elements using the shift register mode of operation using separate shifting clocks. Normal system clocks then capture the responses to these patterns in the memory elements, and these responses are in turn shifted into a tester storage register for comparison with known results.

As a further aid to testing of the integrated circuit device, a boundary-scan method is used in which a memory element (SRL) is placed adjacent to each input/output pin of the device so that signals on the boundary can be controlled and observed using shifting operations. This represents a dramatic simplification of the test equipment in that it is no longer necessary to make physical contact with the actual input/output pin. Additionally, the boundary-scan methodology permits a test of the wires that connect devices within a computer system, by supplying signals to the output SRLs of all devices and sensing such signals at SRL's connected to their inputs. During normal functioning of the device, information signals are stored in these boundary SRLs using one or more system clocks.

One further aid to device and system testing is a method called self-test. A methodology for self-testing in an LSSD environment is described in U.S. Pat. No. 4,503,537 issued to William McAnney, a co-inventor herein, on Mar. 5, 1985 and assigned to the same assignee as the present invention. In accordance with one aspect of this method, the scan outputs of the shift register strings are fed into a so-called multiple input signature register or MISR. During test, the signals captured into the SRLs are "compressed" within the MISR to form a resultant or signature at the end of test that can be compared with the expected or good signature for a pass/fail decision. It is important to note that the integrated circuit device may be self-tested as a stand-alone device, and may also be self-tested when incorporated within the construction of a digital processing system or machine.

In the present invention, attention is specifically focused on the boundary-scan SRLs that are associated with primary inputs to the device. Primary inputs (PIs) are physical pins or terminals through which the outside world supplies information to the device, as opposed to primary outputs (POs) through which the device supplies information to the outside world. During test operations normal system clocks are used to capture test responses into the memory elements or SRLs. These same clocks functionally affect the PI boundary-scan SRLs and, unless controlled, will load into those latches the values on the physical PI pin. This can create either of two problems: First, when the integrated circuit is being tested as a stand-alone device, these PI pins are not driven by the tester, and their values are generally unknown. If self-test is being used, these unknown values or "X" states can be loaded into their SRLs and can contaminate the self-test signature and invalidate the test. Second, if the integrated circuit has been incorporated in the construction of a digital system or machine, self-test of the circuit will load unknown off-circuit values or "X" states to the SRLs and again contaminate the signature.

One approach to avoiding "X" states is to degate all primary input pins from their SRLs during either stand-alone or system level test. This degating circuitry can, by its mere presence, adversely affect the basic machine cycle time. A second approach is to degate the system clocks to the primary input SRLs during test. Again, a similar adverse effect on system performance can occur.

SUMMARY OF THE INVENTION

In accordance with the present invention, primary input SRLs are contained within their own separate set of scan strings. This eliminates the need for any degating on the input side of the PI SRLs since the contents of the separate PI scan strings may conveniently be ignored during test. In further accordance with the concept of segregating primary input SRLs, it is further noted that the scan outputs of the newly segregated set of scan strings is preferably supplied to its own signature register or MISR. In particular, what was previously described as a multiple input signature register, now exists in the form of two separate registers, a fact which also provides greater flexibility as will be described.

In accordance with another embodiment of the present invention, a built-in self-test circuit employs a shift register sequence generator for generating pseudo-random bit sequences to be supplied to a plurality of shift register latch scan strings. These scan strings are divided into a first set of scan strings containing only the SRLs associated with primary inputs, and a second disjoint set of scan strings containing only those SRLs not associated with primary inputs. The first and second set of shift register latch scan strings are supplied respectively to first and second signature registers which are operable to compress signals from the SRLs into separate signatures. Even more particularly, the shift register latches associated with the primary inputs (first set of scan strings) are constructed without delay-causing input degating.

Accordingly, it is an object of the present invention to provide integrated circuit devices and systems exhibiting shorter cycle times.

It is also an object of the present invention to increase the utilization of built-in self-test circuits without adversely affecting circuit delays, particularly those delays associated with primary input signal lines.

It is yet another object of the present invention to provide separate signature registers for selected SRL scan strings.

It is a still further object of the present invention to reduce the amount of circuitry employed on a chip or in a system through the elimination of certain delay-introducing degating circuitry.

It is still another object of the present invention to simplify and reduce signature register information employed in effecting decisions with respect to circuit test and/or function.

It is a still further object of the present invention to be able to separately test the primary input scan paths.

It is also an object of the present invention to facilitate the performance of system level wiring tests.

Lastly, but not limited hereto, it is an object of the present invention to improve system and chip test procedures.

DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

In order to more fully appreciate the present invention, consideration is given to current test methodologies. In particular, a method called self-test using MISR/Parallel SRSG (STUMPS) is used to test integrated circuit chips and devices disposed on thermally cooled substrates, which are generally referred to as thermal conduction modules (TCMs). Here the acronym SRSG stands for Shift Register Sequence Generator. Such devices are typically implemented as linear feedback shift registers. These registers generally comprises a chain of shift register elements in which Exclusive-OR elements in a feedback loop are provided so as to combine several intermediate latch output signals which are returned to the shift register input. The feedback paths are configured to result in the generation of a pseudo-random sequence of binary digits which are employed as test sequences for the above mentioned combinatorial circuits. The design and construction of pseudo-random pattern generators in the form of linear feedback shift registers is well known in the art.

Figure 4:
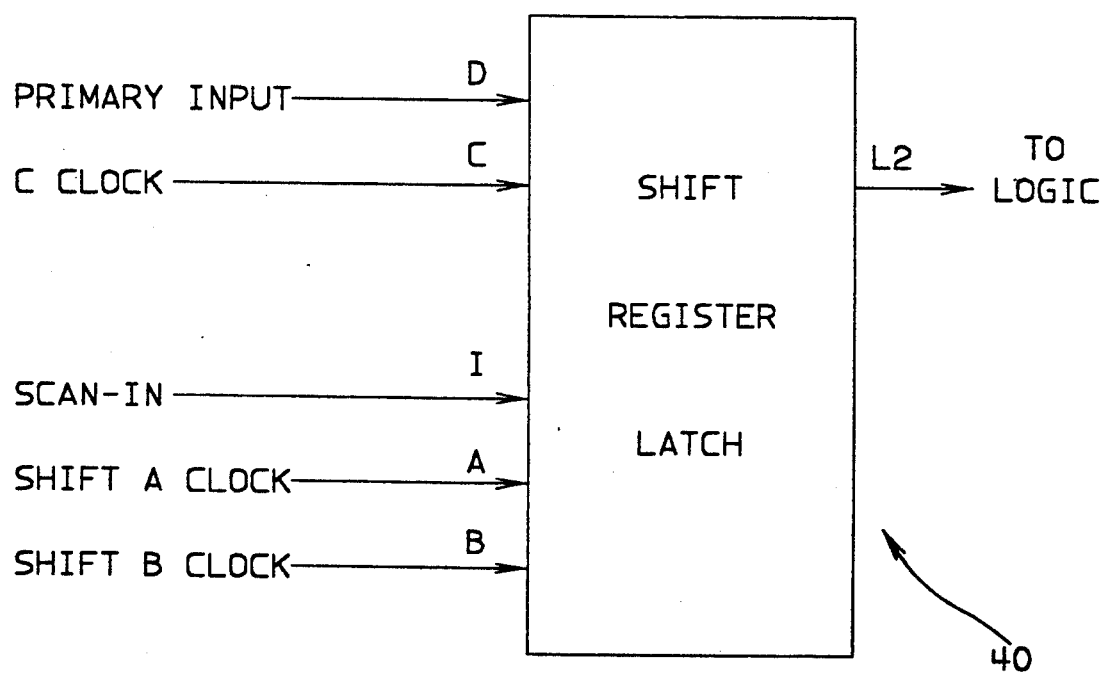
FIG. 4 is a block diagram illustrating the signal lines input to shift register latches associated with primary inputs as a result of the signal line segregation of the present invention.

In general, it is desired to employ shift registers of appropriate length and feedback arrangement to implement the generation of random sequences which repeat only after a very large number of cycles. The SRSG unit, designated by reference numeral 10 in FIG. 1, also typically includes a mechanism for loading initial or seed bit patterns into SRSG 10. Output signals from SRSG 10 are fed through channels to a plurality, M, of different scan paths. Each scan path comprises a plurality of shift register latches 30. The output signals from the latch strings are supplied to signature register or MISR 20, as shown. While this is substantially the same pattern as shown in FIG. 4 of the above mentioned patent to McAnney, it should however be noted that that patent speaks in terms of integrated circuit chip devices. It is however noted that the present invention, while most easily thought of and described in terms of test components which fit upon a single chip device, is not so restricted. In particular, the scan paths may actually be disposed across a plurality of integrated circuit chips which are arranged on a thermal conduction module (TCM).

It should however be appreciated that the shift register latch elements 30 also exist as sequential circuit memory elements in conjunction with combinatorial logic networks that exist on a chip or TCM. Their function as memory elements between blocks of combinatorial logic is more particularly illustrated in FIG. 3 of the above mentioned patent to McAnney, which is hereby incorporated herein by reference as background material. Thus shift register latches 30 serve dual functions. During normal operation of the circuit in its system environment, shift register latches 30 function as memory elements passing signals to be processed from one combinatorial block to another and at the same time typically receiving input signals for subsequent application to combinatorial logic blocks in subsequent clock cycles. Thus the shift register latches play a significant role in establishing and defining stable logic outputs at appropriate points in a machine cycle.

In sum then, output signals from shift register sequence generator 10 are supplied to the scan inputs of channels 1 through M. Each channel comprises a string of shift register latches 30, some of which are boundary scan latches and more particularly, some are boundary scan latches associated with primary inputs. The scan outputs of channels 1 through M drive multiple input signature register 20.

Figure 1:
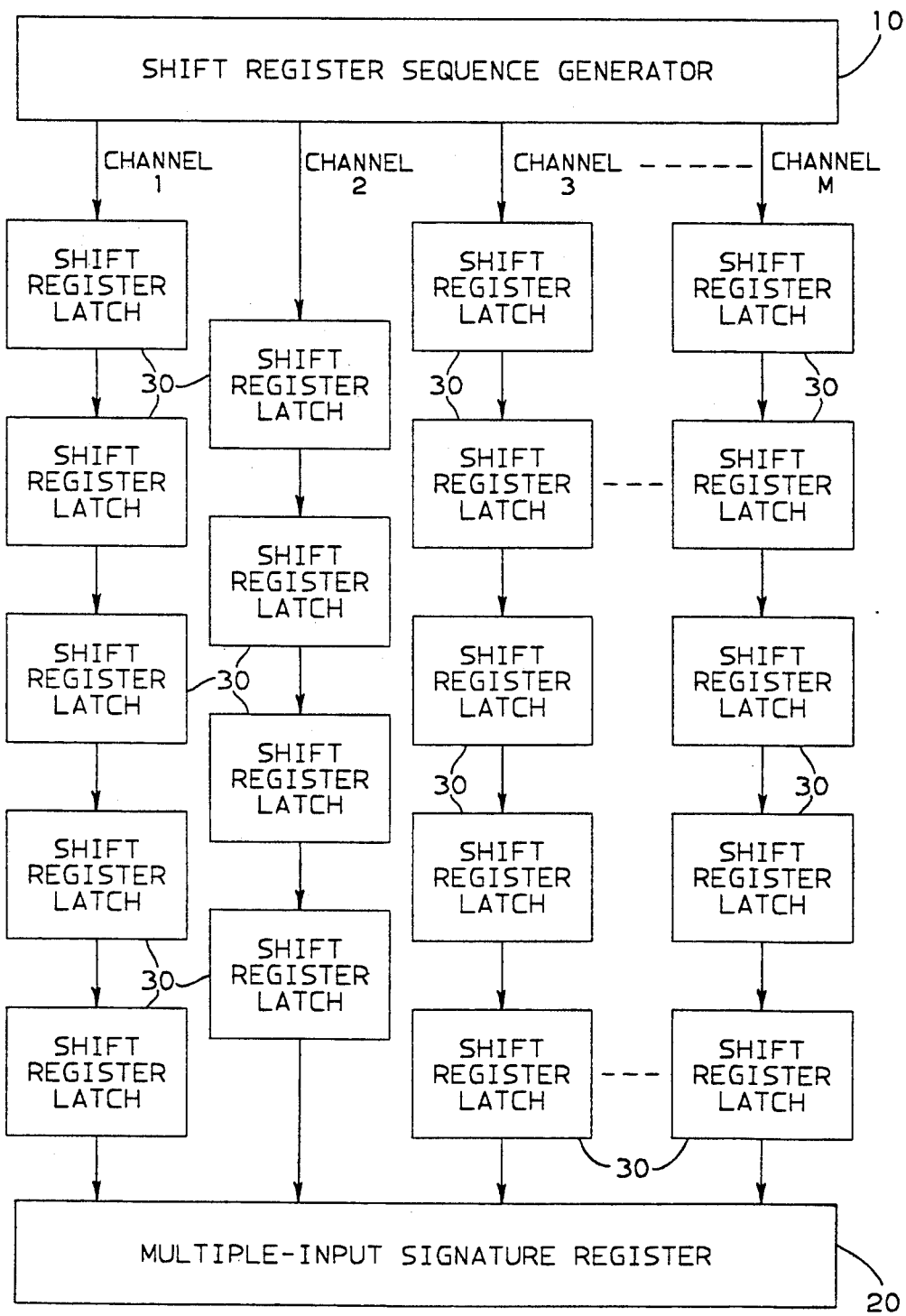
FIG. 1 is a block diagram illustrating a prior art circuit arrangement of shift register latch scan strings.

It is useful in considering FIG. 1 to keep in mind that SRSG 10 and MISR 20 are properly considered to be dedicated test elements. However, shift register latches 30 serve a dual purpose which is more particularly apparent when considering the actual signal supplied to the shift register latches in normal operation.

Figure 2:
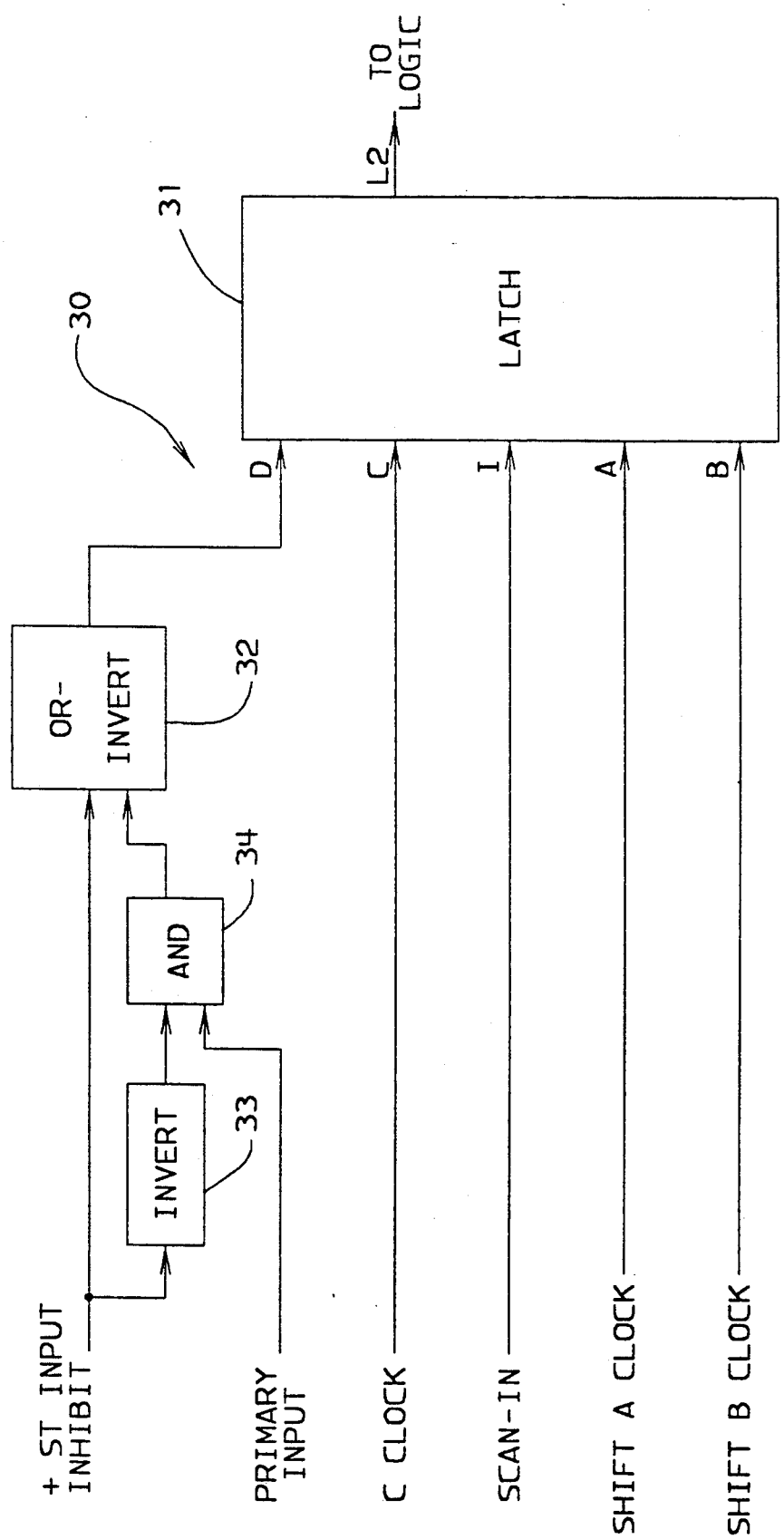
FIG. 2 is a schematic circuit diagram illustrating one possible circuit for degating a primary input pin from its associated boundary-scan SRL.

Attention is now therefore directed to FIG. 2 which specifically illustrates one facet of the problem solved by the present invention. In particular, FIG. 2 shows a detailed view of a boundary scan shift register latch 30 (including latch 31) that is associated with a primary input "pin" and a degating circuit used to prevent unknown or "X" states from being set into the latch during test. During test, latch 31 is loaded with a bit from pseudo-random pattern generator 10 using the "shift A clock" and "shift B clock" signal lines (see FIG. 2 of the above mentioned patent to McAnney). Next, the machine clock C (supplied to the combinatorial circuit blocks) is cycled to capture the logic responses to the test patterns. Finally, the shift register latches, now containing captured test responses are unloaded serially into MISR 20, while simultaneously loading the next test pattern. The test pattern signals are supplied on the line labeled "scan-in" in FIG. 2. A test "pass or fail" decision is obtained after the last test by comparing the signature present in the MISR with a previously computed (correct) signature. Thus when a shift register latch 30 as shown in FIG. 2 is the last latch in a scan string, output L2 from latch 31 is, in addition to its normal destination, also be supplied to MISR 20.

However, the degating circuitry of FIG. 2 introduces certain delays which are becoming unacceptable as the result of integrated circuit design improvements with respect to circuit size. In particular, it is seen that during self-test mode the primary input is degated from the D input of latch 31. This degating is typically accomplished by use of the self-test inhibit signal line designated "+ST input inhibit" which is supplied to inverter 33 and OR-invert circuit 32. OR-invert circuit is also supplied with an input signal from AND gate 34. In turn, AND gate 34 is seen to be supplied from an inverted "+ST input inhibit" signal and the primary input signal. In this way, during non-test times the primary input signal (or its complement) is supplied to latch 31. It is noted that since latch 31 typically possesses true and complement output signal lines, it is sufficient to provide a primary input or its complement to latch 31 without altering the design of the circuit other than by selecting the appropriate output point from latch 31.

As a result of these connections, when the "+ST input inhibit" signal line is off, the "primary input" signal line feeds the system data input of the SRL through AND gate 34 and OR gate 32. During self-test in either stand-alone or in system mode, the "+ST input inhibit" signal line is held to degate the system data input of the SRL from the primary input pin to prevent unknown states from corrupting the test signature.

The problem that occurs is that there is a delay introduced both by the AND and the OR-invert gates shown in FIG. 2 on the signal path between the primary input and shift register latch 31. It is particularly important to note that the delay in FIG. 2 is introduced in a critical path with respect to machine and/or circuit design. While this delay may have been acceptable in past designs, as improvements in lithography are made, delay paths become more critical. Accordingly, if it is possible to eliminate them it is desirable to do so.

It is noted that FIG. 2 illustrates one form of degating circuitry which introduces delay. However, it must be kept in mind that other forms of degating circuitry are equally usable in terms of the present invention. In particular, it would have been possible to have employed a multiplexer circuit instead of gates 32, 33 and 34 in FIG. 2 or to have degated the system clocks to all SRLs associated with primary inputs.

Figure 3A:
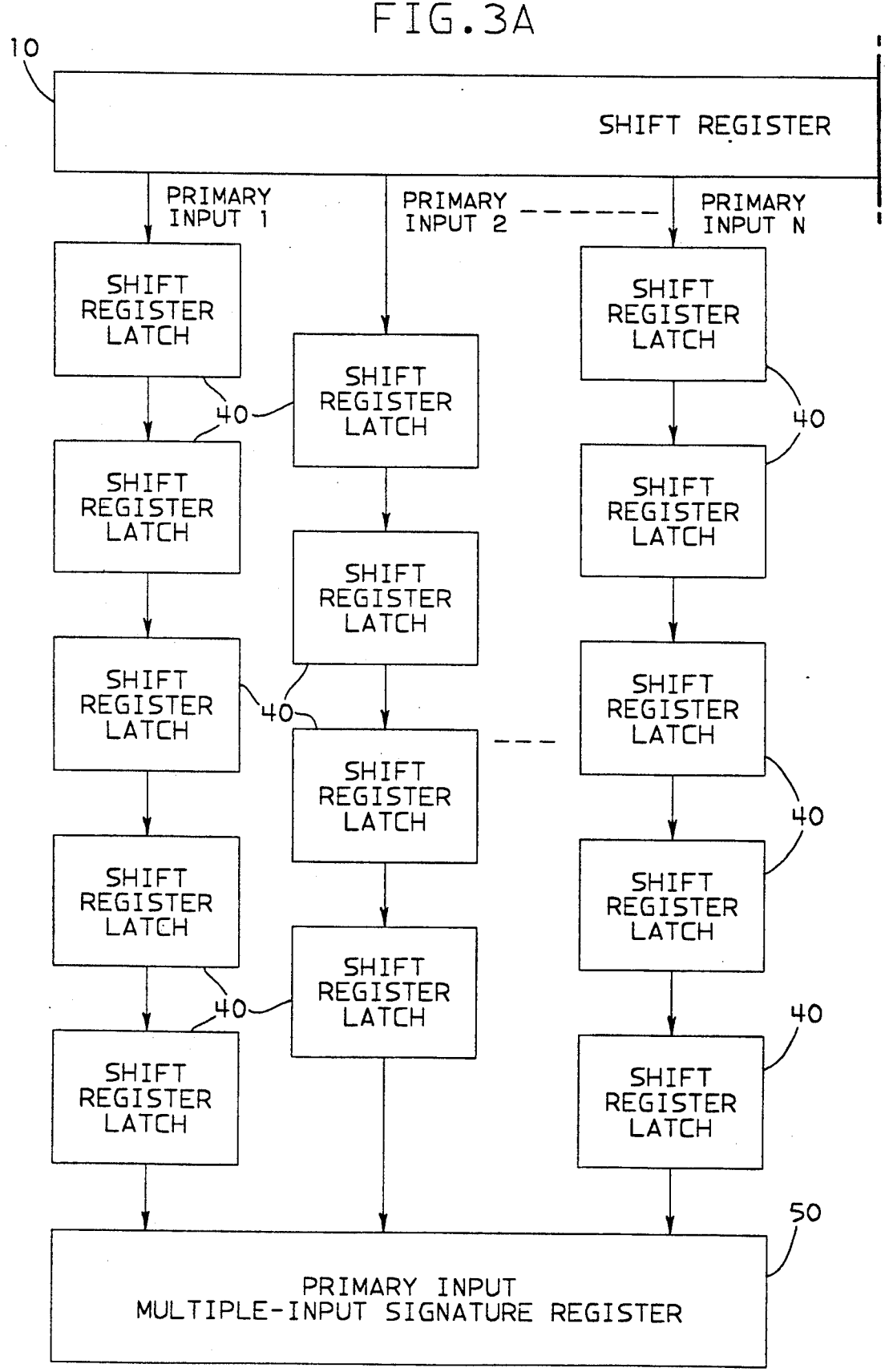
FIG. 3 (shown on two sheets as FIGS. 3A and 3B) is a functional block diagram illustrating the circuit arrangement of the present invention and more particularly illustrating the segregation of primary input signal lines that they supply their own set of SRL scan strings.

The solution to the problem, in accordance with the present invention, is to modify the STUMPS architecture so that all primary input boundary shift register latches are segregated and thus can feed a separate signature register as shown in FIG. 3A. This means that all primary input boundary shift register latches are chained into one or more separate scan strings and that these scan strings contain nothing but (so-called) primary input shift register latches. This means that circuit chips which contain a mixture of primary input shift register latches and other shift register latches will possess at least two scan strings. As used herein the term boundary SRL refers to a shift register latch that is placed adjacent to each input/output pin of the device or system so that signals at the boundary of the device or system can be controlled and observed using shifting operations.

Figure 3B:
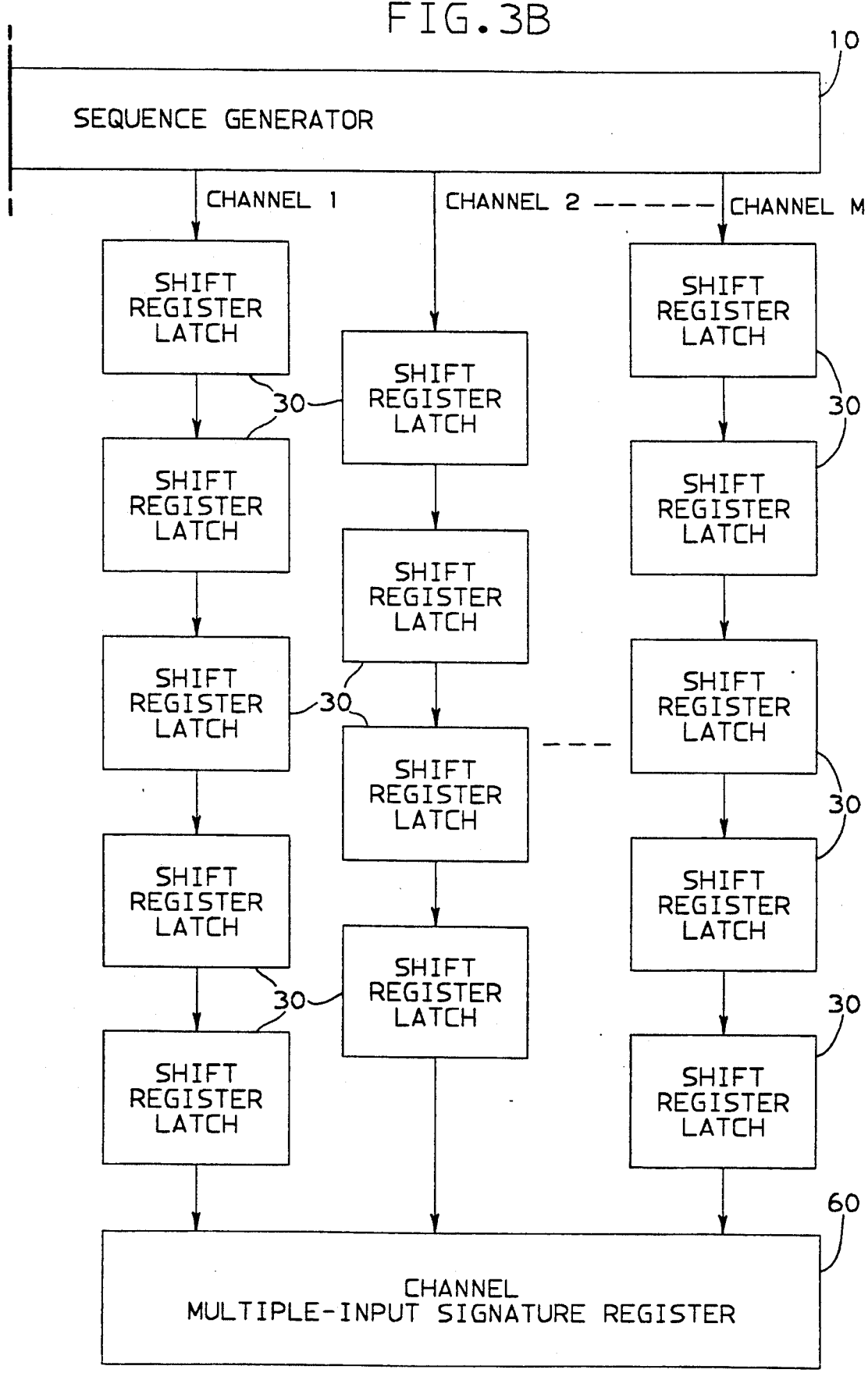

FIG. 3 is illustrative of the proposed configuration. In particular, it is a major feature of the present invention that all primary input signal lines are supplied to SRLs in separate STUMPS channels. This means that these scan string outputs can be directly supplied to a separate primary input MISR 50. Thus, the output signals from SRSG 10 are now divided into two categories: primary input signal lines 1 through N and channel signal lines 1 through M. The scan outputs of channels 1 through M are supplied to their own separate signature registers: channel multiple-input signature register 60. More importantly, the primary input signal lines are supplied to shift register latches 40 which do not require the degating circuitry as shown in FIG. 2. In particular, the design of shift register latch 40 is more particularly illustrated in FIG. 4 where it is seen that, as a result of the segregation of scan paths, the degating circuitry is no longer necessary. The output signals from scan strings having SRL structure 40 are fed to their own separate signature register 50 designated as "primary input/multi-input signature register" in FIG. 3A. This design provides a savings over FIG. 2 of three logic gates per primary input. This is convenient since it is desirable to construct signature register 50 using chip real estate savings obtained by the reduction in degating circuitry.

Now during stand-alone self-test of an integrated circuit device or system or during self-test of a device in a system, the SRLs associated with the primary input pins are loaded with pseudo-random stimulus values from sequence generator 10 as usual. When the machine clocks are cycled, these primary input SRLs are loaded with "X" states. However, these values are compressed in a separate primary input MISR and do not affect output signals being supplied to channel MISR 60. On completion of the self-test, only the signature in the channel MISR needs to be used to determine a good or bad test decision. Furthermore, the primary input MISR can actually be used to test the primary input scan paths by scanning a short sequence of sequence generator patterns along the paths and into the primary input MISR without toggling the system clocks.

The modifications of the present invention also provide advantages in carrying out system level wiring tests. These tests are typically performed to test system wiring and connections that exist between thermal conduction modules containing perhaps a 100 or so semiconductor chip devices. The usual system level inter-TCM wiring test is deterministic. In this test, patterns are scanned into boundary shift register latches on all TCMs. The primary output shift register latches drive the wiring and the system clocks are cycled to capture the responses to the test at primary input shift register latches. The responses are then scanned out for comparison with expected responses.

However, with the modified STUMPS architecture described herein, a wiring test is conductible using pseudo-random patterns. The primary output SRLs are loaded with stimuli from sequence generators and operate to drive inter-TCM wiring. The machine clocks are cycled to load the primary input SRLs with test responses that are subsequently shifted into the primary input MISR. After a suitable number of such sets, the primary input MISR signature is unloaded and compared with the expected signature.

From the above, it should be appreciated that the segregation of primary input signal lines so as to be associated with separate scan strings in an LSSD environment provides a mechanism for eliminating degating circuitry at the input of shift register latches in the scan strings. It is further seen that the elimination of this circuitry reduces delay in a critical path which could otherwise introduce undesirable delays in machine cycle time. It is further seen that the present invention also provides segregated signature registers associated with primary input signals and for channel signals. In this way, comparison tests for circuit pass or fail conditions are simpler in that unnecessary comparisons are eliminated and fewer signal lines must be employed. Furthermore, it is seen that the elimination of degating circuitry has provided advantages in terms of increased available chip real estate for other purposes, including a separate primary input MISR. It is also noted that while the description above refers to blocks of combinatorial circuits, it is not intended that this characterization preclude the existence of sequential circuits within such blocks.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

We claim:

1. An apparatus for the built-in self testing of sequential digital logic circuits, said apparatus comprising:
    means for generating pseudo-random bit sequences on a plurality of output signal lines;
    a first set of shift register latches comprising at least one scan string coupled to said output signal lines of said sequence generating means;
    a second set of shift register latches comprising at least one scan string distinct from any string in said first set of shift register latches, with at least one scan string from said second set also being coupled to said output signal lines of said sequence generating means;
    a first register coupled so as to receive output bit sequences from at least one scan string from said first set of shift register latches; and
    a second register coupled so as to receive output bit sequences from at least one scan string from said second set of shift register latches.

2. The apparatus of claim 1 in which said first set of shift register latches comprises memory elements receiving primary inputs to said sequential circuit.

3. The apparatus of claim 1 in which said first set of shift register latches are arranged in a plurality of scan strings.

4. The apparatus of claim 1 in which said second set of shift register latches are arranged in a plurality of scan strings.

* * * * *